(12) United States Patent
Richmond (10) Patent No.: US 7,708,424 B2
(45) Date of Patent: May 4, 2010

(54) SOLAR POWERED FLUORESCENT GAZING GLOBE

(76) Inventor: Simon Nicholas Richmond, 47 Grasmere Rd., Princeton, NJ (US) 08540

( * ) Notice: Subject to any disclaimer, the term of this patent is extended or adjusted under 35 U.S.C. 154(b) by 89 days.

(21) Appl. No.: 11/420,160

(22) Filed: May 24, 2006

(65) Prior Publication Data

US 2006/0227542 A1  Oct. 12, 2006

Related U.S. Application Data

(63) Continuation-in-part of application No. 11/303,247, filed on Dec. 16, 2005.

(60) Provisional application No. 60/642,382, filed on Jan. 7, 2005.

(51) Int. Cl.
*F21L 4/00* (2006.01)

(52) U.S. Cl. .................. 362/183; 362/84; 362/186; 362/363

(58) Field of Classification Search .................. 362/183, 362/84, 186, 363
See application file for complete search history.

(56) References Cited

U.S. PATENT DOCUMENTS

| | | | |
|---|---|---|---|
| 1,407,534 A | 2/1922 | Hering | |
| 1,637,963 A | 8/1927 | Sauvage | |
| 2,096,604 A * | 10/1937 | Bissell | ......................... 362/311 |
| 2,372,071 A | 3/1945 | Fernberger | |
| 2,979,467 A | 4/1961 | Keller | |
| 4,841,416 A * | 6/1989 | Doss | ........................... 362/183 |
| 4,857,228 A | 8/1989 | Kabay | |
| 5,043,096 A | 8/1991 | Lindmayer | |
| 5,376,303 A | 12/1994 | Royce et al. | |
| 5,424,006 A | 6/1995 | Murayama et al. | |
| 5,472,737 A | 12/1995 | Anders | |
| 6,039,453 A * | 3/2000 | Wang | ......................... 362/101 |
| 6,046,401 A * | 4/2000 | McCabe | ...................... 136/244 |
| 6,517,217 B1 * | 2/2003 | Liao | ............................. 362/235 |
| 6,565,057 B1 * | 5/2003 | Cohen | ........................ 248/314 |
| 6,616,292 B2 * | 9/2003 | Lin et al. | ..................... 362/101 |
| D529,655 S * | 10/2006 | Allsop et al. | ................. D26/68 |
| 7,252,889 B2 | 8/2007 | Kao | |
| 7,273,294 B2 | 9/2007 | Kao | |
| 2004/0095749 A1 * | 5/2004 | Bilotti | ........................ 362/102 |
| 2005/0135101 A1 | 6/2005 | Richmond | |
| 2005/0248285 A1 | 11/2005 | Richmond | |
| 2005/0265017 A1 * | 12/2005 | Ronn et al. | .................. 362/194 |
| 2006/0139912 A1 * | 6/2006 | Norton et al. | ............... 362/191 |
| 2007/0030666 A1 | 2/2007 | Cohen | |

* cited by examiner

*Primary Examiner*—Sandra L O'Shea
*Assistant Examiner*—Jessica L McMillan (57) ABSTRACT

A solar-powered gazing globe. A removable base is attached to the glazing globe by a stretchable, waterproof flange that also provides a water resistant seal while allowing the globe to sit in an existing support. The gazing globe further includes a rechargeable electrical power source coupled to an electrical charging system. The electrical charging system is in turn connected to a solar energy system that includes a system for collecting solar energy, a system for converting the solar energy into electrical energy, and a system for transferring the electrical energy to the charging system. A light source attached to the removable base is electrically coupled to the rechargeable electrical power source and situated so that light is emitted from the gazing globe via the light transmitting region.

19 Claims, 10 Drawing Sheets

SOLAR POWERED FLUORESCENT GAZING GLOBE

CROSS REFERENCE TO RELATED APPLICATIONS

This application is a Continuation-in-Part of U.S. patent application Ser. No. 11/303,247 filed on Dec. 16, 2005 by Simon N. Richmond entitled "An Illuminated Wind Chime", that in turn claims priority from, U.S. Provisional Patent application No. 60/642,382 filed on Jan. 7, 2005 by S. Richmond entitled "Wind Chime", the entire contents of both of which are hereby incorporated by reference.

FIELD OF THE INVENTION

The present invention relates, in general, to garden or landscaping ornamental structures and, more specifically, to solar powered, illuminated gazing globes.

BACKGROUND OF THE INVENTION

So-called gazing globes have their roots in hand-blown glass spheres first made by 13th century Venetian craftsmen. In addition to the practical benefits of being a spherical mirror, gazing globes have also being considered good luck charms and to have magically protective powers against evil spirits. Over the centuries, they have became a permanent fixture in European gardens and homes. Even King Ludwig II, King of Bavaria, adorned his palace, a replica of Versailles, with a gazing globe during the 1800's.

Gazing globes are typically formed of a hollow, glass globe which has a small diameter and short length neck extending from the spherical portion of the globe. Gazing globes are typically provided in a variety of different colors.

Such globes typically rest, and are supported, on columns or metal stands mounted on the ground or in brackets attached to a vertical surface. A cylindrical recess in the top surface of the columns and brackets receives the neck of the gazing globe to fixedly position the gazing globe on the column or bracket. It is also known to support gazing globes in a cylindrical sleeve or receiver which is mounted at one end of a support formed of one or more interconnected metal rods. In all such applications, the spherical portion of the gazing globe is disposed uppermost above the associated support column or collar so as to clearly view from all sides.

It would be desirable to provide an illuminated gazing globe which provides a different nighttime aesthetic appearance, while still providing the necessary globe support function and which is compatible with most commonly used gazing globe holders which have such a cylindrical receiving portion.

It would further be desirable to provide a solar lighting gazing globe adaptor which can receivably be connected to existing gazing globes and used in their existing holders and which would illuminate the gazing globes at night from within.

SUMMARY OF THE INVENTION

The present invention is a solar-powered lighting attachment that may be attached to an existing gazing globe and be accommodated by an existing gazing globe support.

In a preferred embodiment of the invention, the solar-powered lighting attachment includes a base portion having substantially tubular flange. The base portion may be removably attached to the tubular neck of the glazing globe by the substantially tubular flange. The tubular flange may be made, in part from a stretchable, waterproof material so as to provide a substantially water resistant seal. The base portion, including the tubular flange may be sufficiently compact to be accommodated by the existing gazing globe support, even when attached to the gazing globe.

The solar-powered lighting attachment for a gazing globe further includes a rechargeable electrical power source coupled to an electrical charging system. The electrical charging system is in turn connected to a solar energy system that includes a system for collecting solar energy, a system for converting the solar energy into electrical energy, and a system for transferring the electrical energy to the charging system.

In a preferred embodiment of the invention there is also at least one lighting subsystem comprising at least one light source. The light source may be attached to the base portion and electrically coupled to the rechargeable electrical power source. The light source is situated so that light is emitted from the gazing globe via the light transmitting region.

In a further embodiment of the invention, the base portion and the gazing ball neck may also be mounted on an upright pedestal or a stake for supporting the holder on a horizontal surface, such as the ground or the floor.

The solar lighted gazing globe of the present invention provides a unique ornamental or decorative appearance for a conventional gazing globe while avoiding interference with existing gazing ball supports. The present holder uniquely enables a gazing globe to be illuminated from within when the gazing globe is placed in commonly found or existing gazing globe holders.

These and other features of the invention will be more fully understood by references to the following drawings.

DETAILED DESCRIPTION

The present invention relates to gazing globes and particularly to solar powered gazing globes.

In a preferred embodiment, the solar powered gazing globe is a modified gazing globe having an internally located light powered using a rechargeable battery and solar panels. In this manner, power can be accumulated during the day and used to provide illumination at night.

A preferred embodiment of the illuminated gazing globe will now be described by reference to the accompanying drawings in which, as far as possible, like numbers represent like elements.

Figure 1:
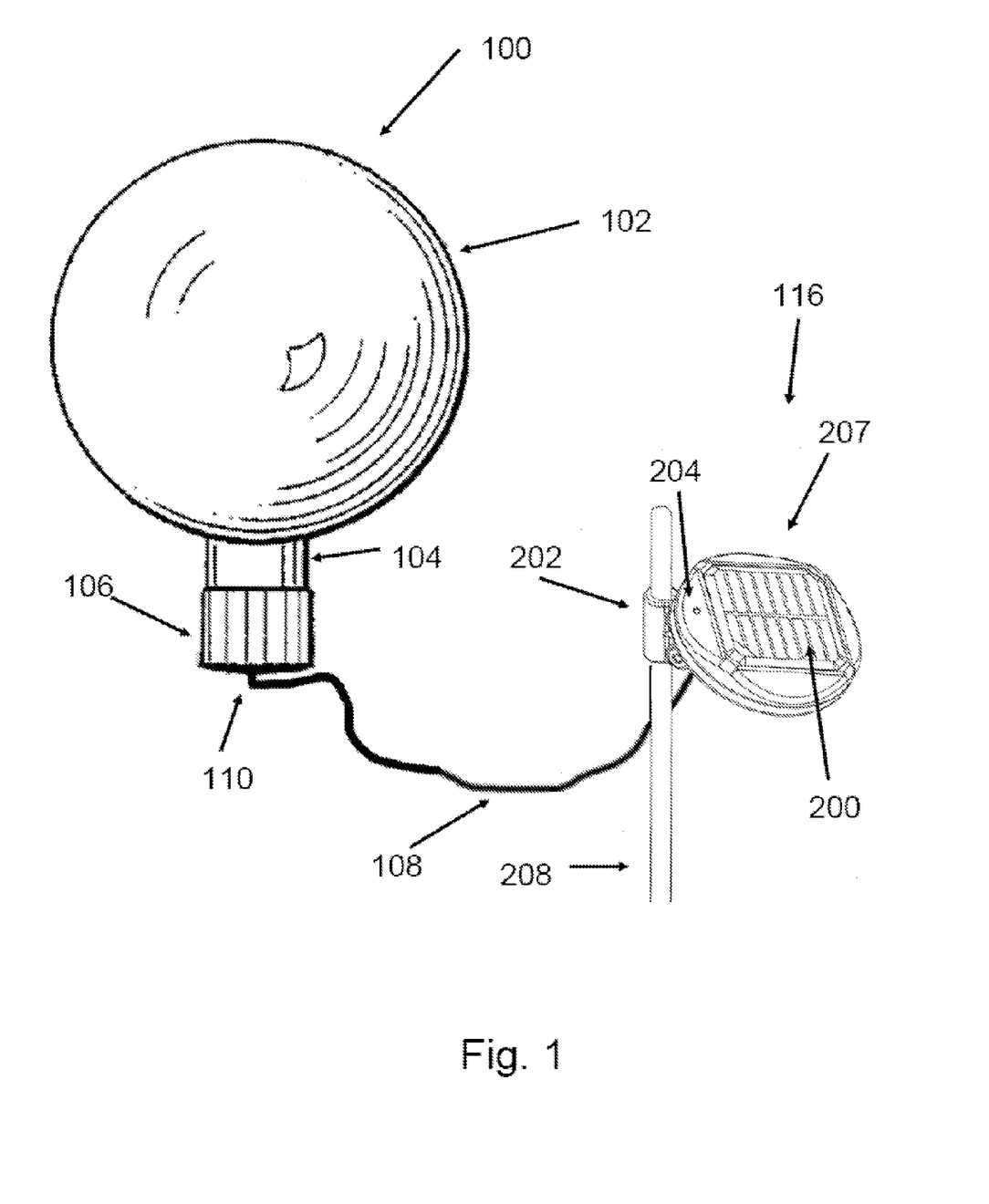
FIG. 1 is a schematic view of a solar powered gazing ball in accordance with an embodiment of the present invention.

FIG. 1 is a schematic view of a solar powered gazing ball in accordance with an embodiment of the present invention. A gazing globe 100 consists of a hollow glass sphere 102 and a tubular neck 104. A base portion 110 has a substantially tubular flange 106. The base portion 110 is attached to the tubular neck 104 of the gazing globe 100 by the tubular flange 106. The tubular flange 106 may, for instance, be made, in part of a stretchable and waterproof material such as, but not limited to, a silicone rubber, a plastic or other rubber material. In this way, the tubular flange 106 forms a water proof seal with the tubular neck 104 of the gazing globe 100, preventing moisture entering the interior of the hollow glass sphere 102. This protects both any electronics contained within the gazing globe 100 and also, in the case where the gazing globe 100 incorporates fluorescent materials on the interior, the fluorescent materials. The base portion 110 has a conductive wire 108 that connects to a solar power collecting system 116. The solar power collecting system 116 includes one or more solar panels 200, a solar panel holder 207 and a light detecting element 204. The solar power collecting system 116 is attached to a stake 208 by means of a clamp 202.

Although the gazing globe 100 is illustrated as a hollow glass sphere 102, one of ordinary skill in the art will readily appreciate that a gazing globe of a variety of shape could readily be substituted, including, but not limited to, gazing globes that a portions of a spheroid, rotationally symmetric tear drop shapes, flower shaped, including open, trumpet-like flower shapes. Furthermore, one of ordinary skill in the art will readily appreciate that the inventive concepts of this application may be applied to plastic and glass structures that do not have rotational symmetry such as, but not limited to, box or cube shaped lantern like structures.

The partially luminescent gazing globe 100 may be constructed using a number of methods. One method is by introducing the luminescent elements into the hollow form through an aperture so that they cling to the inner wall of the globe. Thus there appear luminescent and non-luminescent areas as the application of the luminescent elements on the inner wall does not have a one hundred percent density. This method is outlined in US Patent Application 20050003120.

A second method is purely for hand blown glass objects. During the construction of the form of the glass object, when the glass is still very hot, the hot glass object is briefly put in contact with small glass luminescent fragments. Since the glass is still very hot, the small glass pieces adhere to the outside of the soft glass. The glass is then reheated and the small glass pieces melt into the surface of the glass. Often the glass object is a tube and is then further blown and expanded into a larger diameter shape. As the expansion occurs, the melted luminescent fragments expand in diameter creating larger luminescent regions. The combined glass object is then cooled.

A third method is for cast glass objects where the small glass luminescent fragments are introduced into the molten glass before casting and then during casting, spread through the cast shape with the molten main glass flow.

A fourth method may be used with a thermoplastic lens instead of a glass lens.

Figure 2:
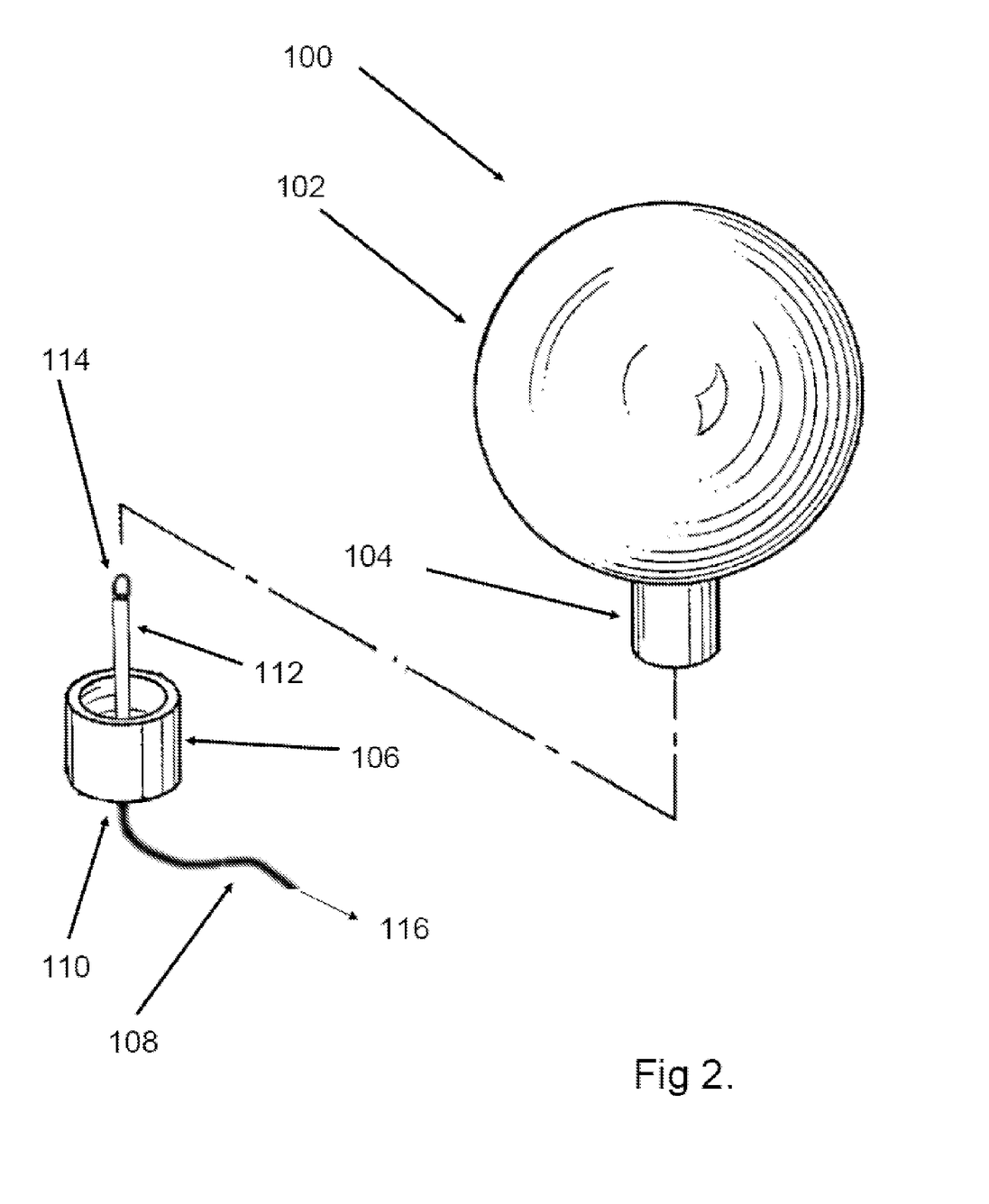
FIG. 2 is a schematic view showing a dismantled solar powered gazing ball in accordance with an embodiment of the present invention.

Although the embodiment described herein utilizes spherical objects, it will be apparent to one of skill in the art that any other shape may be used, so long as access is provided to an internal cavity for the light to be directed therein. As additional examples of many, the invention may accordingly be used to provide illuminated and illuminated plus luminescent animal forms, faux rocks, statues, bird baths, bird feeders, hose guides, hanging decorations, planters and so forth FIG. 2 is a schematic view showing a dismantled solar powered gazing ball in accordance with an embodiment of the present invention. The gazing globe 100 is shown removed from the tubular flange 106 and the base portion 110. This allows a light support 112 to be seen. The light support 112 supports a light source 114 so that it may be well within the hollow glass sphere 102 when the base portion 110 is held to the tubular neck 104 by means of the tubular flange 106. The conductive wire 108 may run up the interior of the light support 112 to the light source 114. The light source 114 that may be configured so as to resemble the appearance of a candle. The light source 114 may include one or more light emitting elements (LEDs), and the light source 114 may be formed of translucent material so that light passing through the light source 114 during use is diffused.

The solar panels 200, which serves to convert solar power to electrical power, may be in the form of encapsulated polycrystalline PV solar panels or any other suitable solar power converting means.

Figure 3:
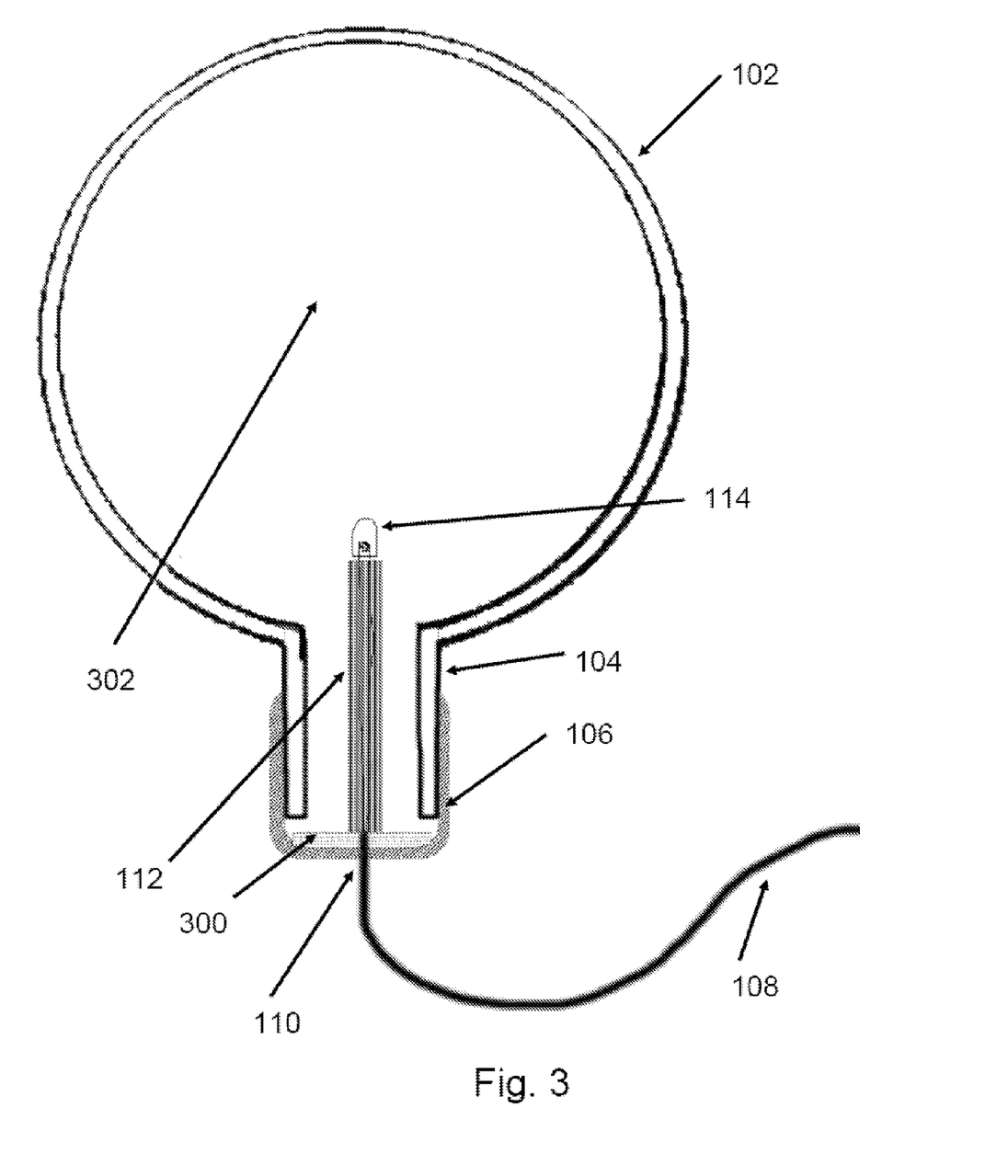
FIG. 3 is a cross-sectional view of a solar powered gazing ball in accordance with an embodiment of the present invention.

FIG. 3 is a cross-sectional view of a solar powered gazing ball in accordance with an embodiment of the present invention. The base portion 110 is attached to the tubular neck 104 of the gazing globe 100. The light support 112 may be attached to a base element 300. The base element 300 may serve to center the light support 112 and hold the light source 114 within the interior of the gazing globe 302.

Figure 4:
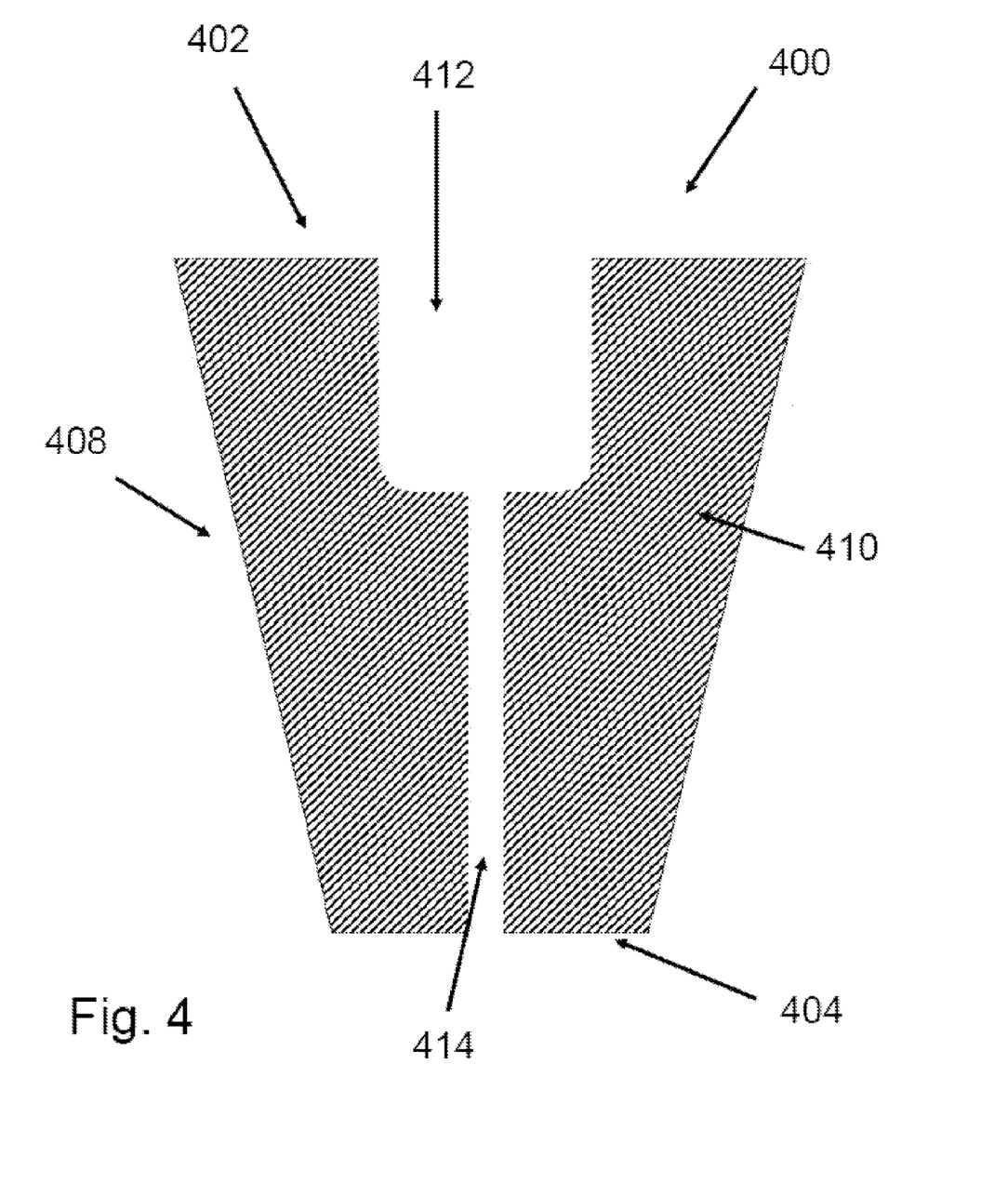
FIG. 4 is a cross-section view of a gazing ball support.

FIG. 4 is a cross-section view of a gazing ball support 400. The gazing ball support 400 is typically a cylindrical container having a top surface 402 and a base 404. The gazing ball support 400 may have a tapered side 408. The gazing ball support 400 may be a solid structure with an interior 410 that is wood, concrete, plastic or other solid or semi-solid material suitable for outdoor use. In addition, the gazing ball support 400 has a cylindrical recess 412 designed to comfortably accommodate the tubular neck 104 of the gazing globe 100. The gazing ball support 400 may further have an axial conduit 414 running through its center of rotational symmetry.

Although the gazing ball support 400 has been shown as a simple pedestal, one of ordinary skill in the art will appreciate that a gazing ball support 400 may take many forms and still embody the inventive concepts of this application including, but not limited to, figure like statures or portions thereof, including, but not limited to, angels, hands, animals, children or women. Furthermore, these figures may be in any poses including, but not limited to, standing, kneeling or sitting while still retaining the necessary structure required for supporting the gazing globe 100 such as, but not limited to, structure selected from the top surface 402, the cylindrical recess 412, the axial conduit 414 or the base 404 or any suitable combination thereof.

Figure 5:
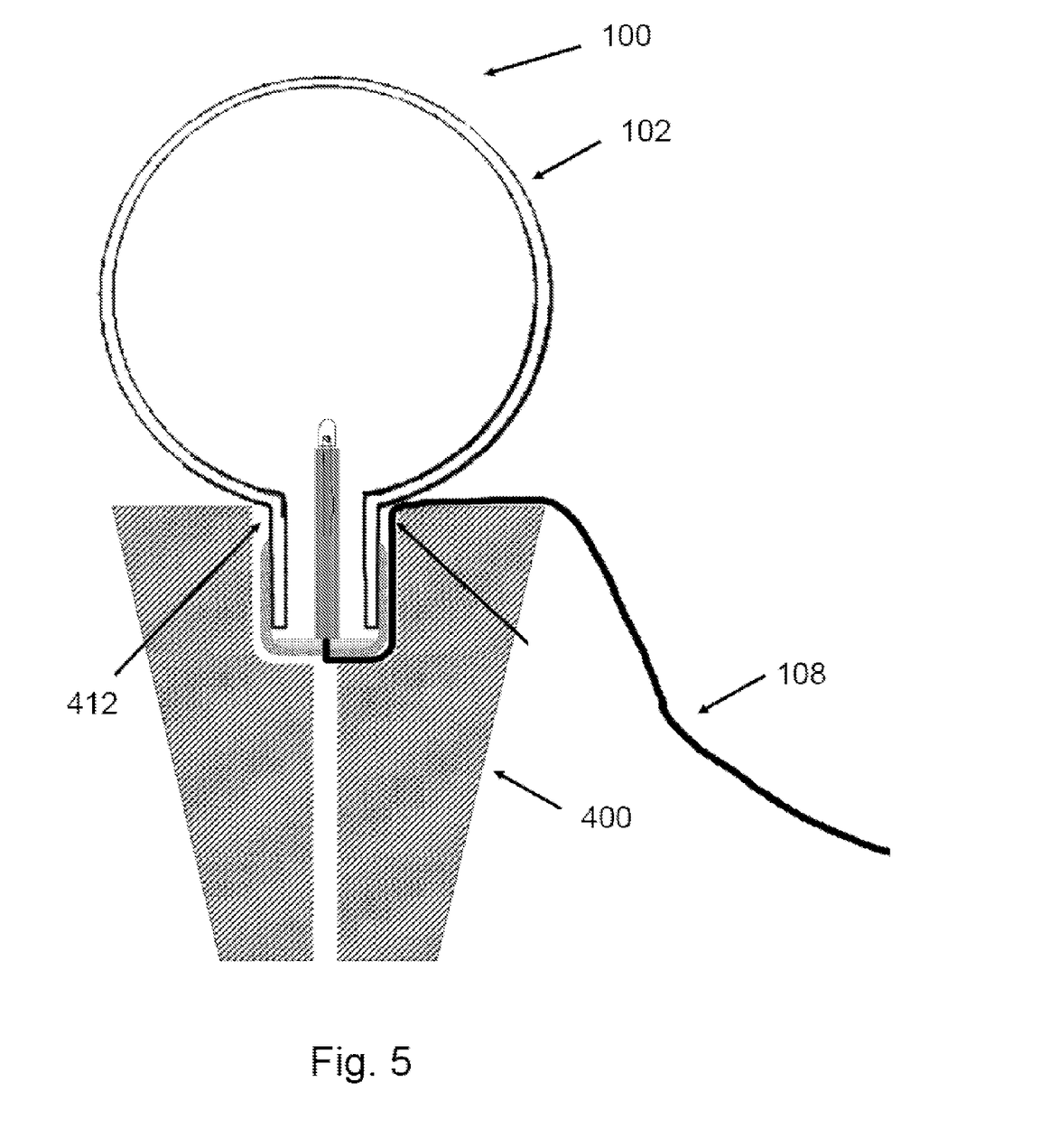
FIG. 5 is a cross-section view of a solar gazing ball in accordance with an embodiment of the present invention mounted in a support.

FIG. 5 is a cross-section view of a solar gazing ball in accordance with an embodiment of the present invention mounted in a support. The gazing globe 100 has its tubular neck 104 with the base portion 110 attached via the tubular flange 106 located in the cylindrical recess 412 of the gazing ball support 400. The conductive wire 108 is looped back up the cylindrical recess 412 and over the top surface 402.

Figure 6:
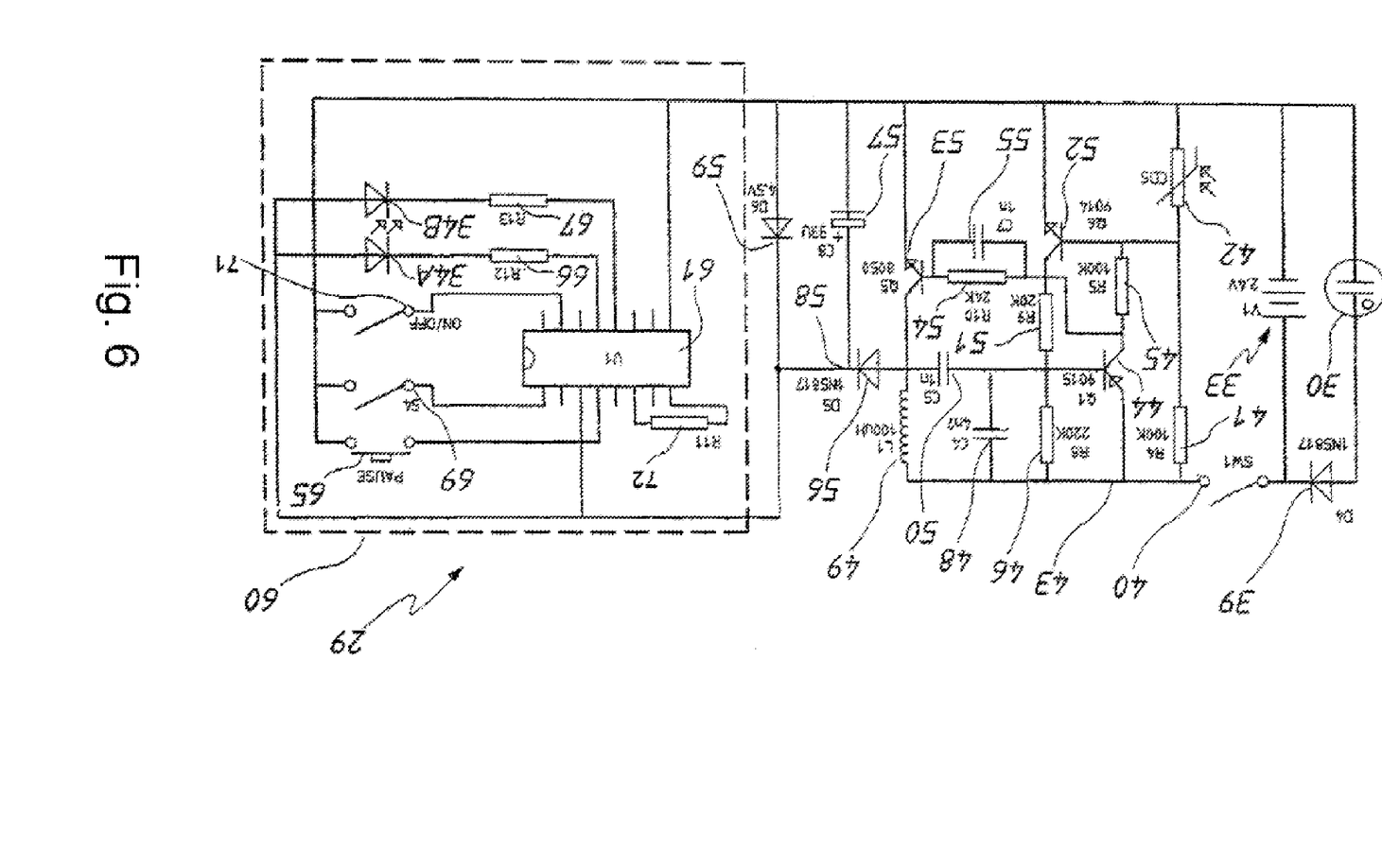
FIG. 6 is a schematic diagram showing a power control circuit.

FIG. 6 is circuit diagram showing circuitry for controlling a two color led display. This circuitry similar to that described in detail in U.S. patent application Ser. No. 10/789,488 of S. Richmond entitled "A solar powered light assembly to produce a light of varying colors" filed on Feb. 6, 2004, and in continuation-in-part U.S. patent application Ser. No. 11/102,229 of S. Richmond entitled "A solar powered light assembly to produce a light of varying colors" filed on Apr. 7, 2005, the contents of both of which are hereby incorporated by reference. The power supply circuit comprises a solar cell 130 connected in series to a forward biased diode 39, which is in turn connected to a positive terminal of a battery 33. A negative terminal of the battery 33 is then connected to the solar cell 30 to complete the power supply circuit. In this example, the diode 39 is a model number IN5817 Schottky diode and the battery comprises two rechargeable 1.2 volt battery cells. It will be apparent to a person skilled in the art that other diode and battery configurations may be utilized without departing from the spirit and scope of the invention.

When the solar cell 30 is exposed to sufficient light, the solar cell converts some of the solar energy to electrical energy and creates a current that passes through the diode 39 to charge the battery 33. Thus, during the day the solar cell 30 converts energy from the sun to charge the battery 33. The diode 39 prevents the battery 33 from expending 30 any power on the solar cell 30.

The power supply circuit is connected in parallel to the light operated circuit, which is connected across the terminals of the battery 33. The positive terminal of the battery 33 is connected to a switch 40, which is in turn connected to a 100 kΩ first resistor 41. The first resistor 41 is connected in series with a second, light-dependent resistor 42. The second resistor 42 connects to the negative terminal of the batteries 33 to complete the light operated circuit. The value of resistance of the second resistor 42 depends on the amount of light to which the second resistor 42 is exposed. When there is not much light, such as occurs during the night, the value of the second resistor 42 increases. During the daytime, when there is sufficient light, the value of the second resistor 42 decreases. Accordingly the resistor 42 allows the lighting device to operate only when there is insufficient light, i.e., at night.

The boost-up circuit is connected to the light operated circuit, in parallel with the first resistor 41 and the second, light-dependent resistor 42. A first circuit node 43 is defined between the switch 40 and the first resistor 41. Connected to the node 43, is an emitter terminal of a first triode 44. A collector terminal of the first triode 44 is connected in series with a 100 kΩ third resistor 45. The third resistor 45 is then connected to a point between the first resistor 41 and the second resistor 42.

A 220 kΩ fourth resistor 46 is connected to node 43 across the emitter and base terminals of the first triode 44. In parallel with the fourth resistor 46, and also connected across the emitter and base terminals of the first triode 44, is a 4.7 nF first capacitor 148.

Further connected to node 43, across the emitter and base terminals of the first triode 44 and in parallel with each of the fourth resistor 46 and the first capacitor 48, is a 100 µH inductor 49 in series with a 1 nF second capacitor 50. The second capacitor is then connected to the base terminal of the first triode 44.

A 20 kΩ fifth resistor 51 is connected across the base and collector terminals of the first triode 44. Connected across the terminals of the third resistor 45 are the collector and base terminals, respectively, of a second triode 52. The emitter terminal of the second triode 152 is connected to the negative terminal of the batteries 33. Connected between the inductor 49 and the second capacitor 150 is the collector terminal of a third triode 53. The base terminal of the third triode 53 is connected via an intermediary circuit to the collector terminal of the second triode 52. The intermediary circuit consists of a 2.4 kΩ fourth resistor 54 in parallel with a 1 nF third capacitor 55. The emitter terminal of the third triode 53 is connected to the negative terminal of the battery 33.

Also connected between the inductor 49 and the second capacitor 50 is the rectifier circuit. A forward biased second diode 56 is connected to a point between the inductor 49 and the second capacitor 50, and then to a positive terminal of a 33 µF fourth capacitor 57. The negative terminal of the fourth capacitor 57 is connected to the negative terminal of the battery 33. A second circuit node 58 is defined between the second diode 56 and the fourth capacitor 57. Connected in parallel with the fourth capacitor 57, between the second node 158 and the negative terminal of the battery 33 is a reverse biased 4.5V third diode 59. The second diode 56, the fourth capacitor 57 and the third diode 59 comprise the rectifier circuit. Further connected to the second circuit node 58, in parallel with each of the capacitor 57 and the reverse diode 59, is a light circuit 160.

The light circuit 60 contains an integrated circuit (C) 61 for controlling lighting effects provided by the lighting device 10. In the embodiments shown, the IC 61 is a 16-pin, two color LED IC for controlling first and second light emitting diodes (LEDs) 34A and 34B. Each of pins 1 and 15 is connected in series to respective switches 69 and 71. Each of the switches 69 and 71 is then connected to the negative terminal of the battery 33. In one embodiment, the switches 69 and 71 correspond to the LEDs 34A and 34B to enable or disable a particular color range. In another embodiment, the switches 69 and 71 determine the frequency of a color changing effect. In a further embodiment, the switches 69 and 71 determine the intensity of light emitted by each of the LEDs 34A and 34B. Various combinations of the frequency and intensity of light are also possible. The switches 69 and 71 can be made accessible to a user to create custom lighting effects. Alternatively, the switches 69 and 71 are set according to a predetermined configuration and are not readily accessible by a user.

Pin 4 of the IC 61 enables an optional pause function. In this embodiment, pin 4 connects to a push button 65 that is, in turn, connected to the negative terminal of the batteries 33. Pin 3 of the IC 161 connects to the second circuit node 58. Connected to the second circuit node 58, and in parallel with one another, are the first and second forward biased light emitting diodes (LEDs) 34A and 34B.

The first LED 34A is connected in series with a sixth resistor 66 that is connected to pin 13 of the IC 61. The second LED 34B is connected in series with a seventh resistor 67 that is connected to pin 12 of the IC 61. In this example, the first LED 34A emits white light and the second LED 34B emits predominantly ultraviolet light.

Pins 6 and 8 of the IC 61 are tied to one another via a ninth resistor 72, which in the embodiment shown is a 20K ohm resistor. The valve of the ninth resistor 72 determines the frequency of a color change created by the IC 61. Accordingly, using different resistor values for the ninth resistor 72 produces color changes of different frequencies. Pin 9 of the IC 61 is tied to the negative terminal of the battery 33.

Figure 7:
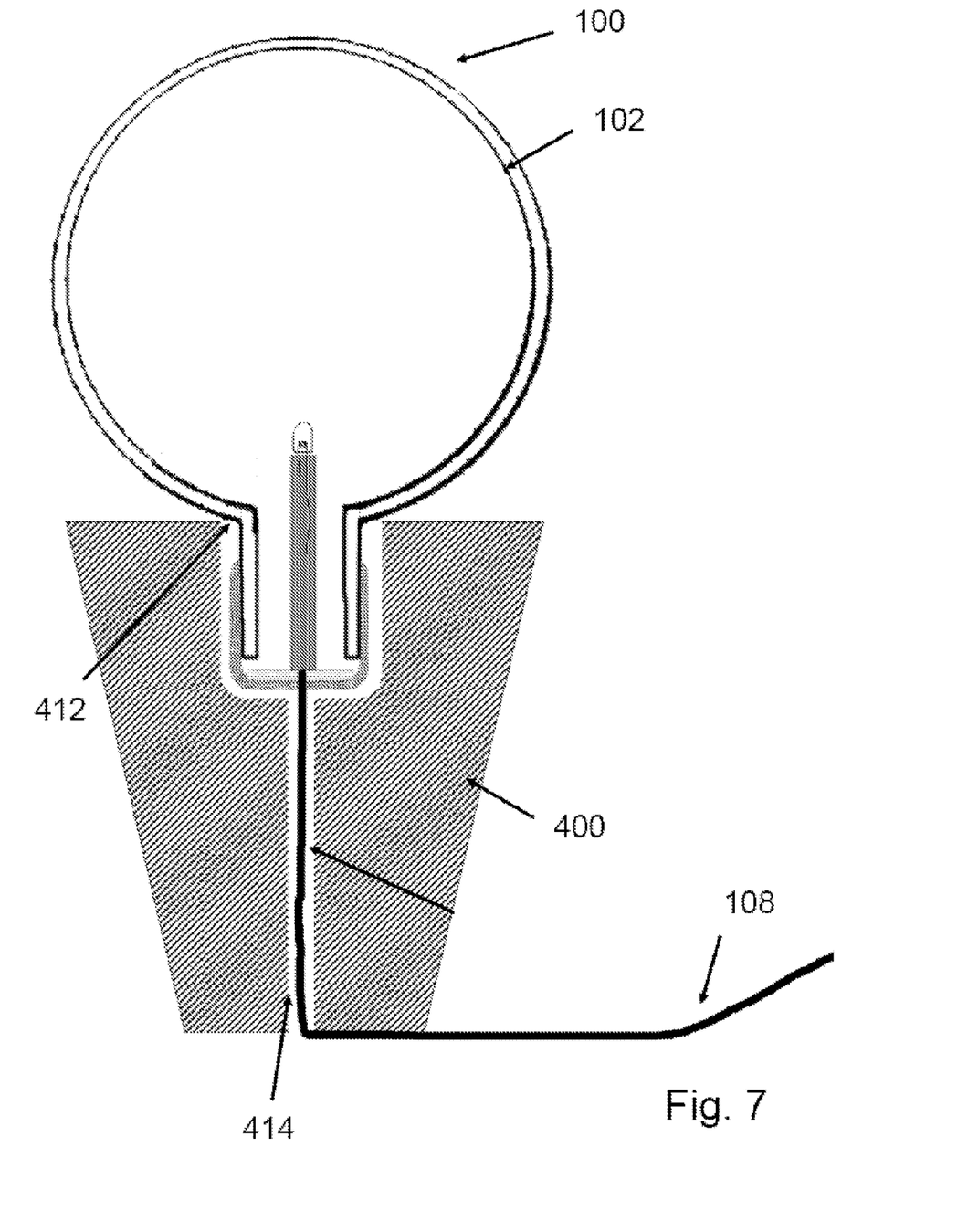
FIG. 7 is a cross-section view of a solar gazing ball in accordance with an embodiment of the present invention mounted in a support.

FIG. 7 is a cross-section view of a solar gazing ball in accordance with an embodiment of the present invention mounted in a support. The gazing globe 100 has its tubular neck 104 with the base portion 110 attached via the tubular flange 106 located in the cylindrical recess 412 of the gazing ball support 400. The conductive wire 108 is fed down the axial conduit 414.

Figure 8:
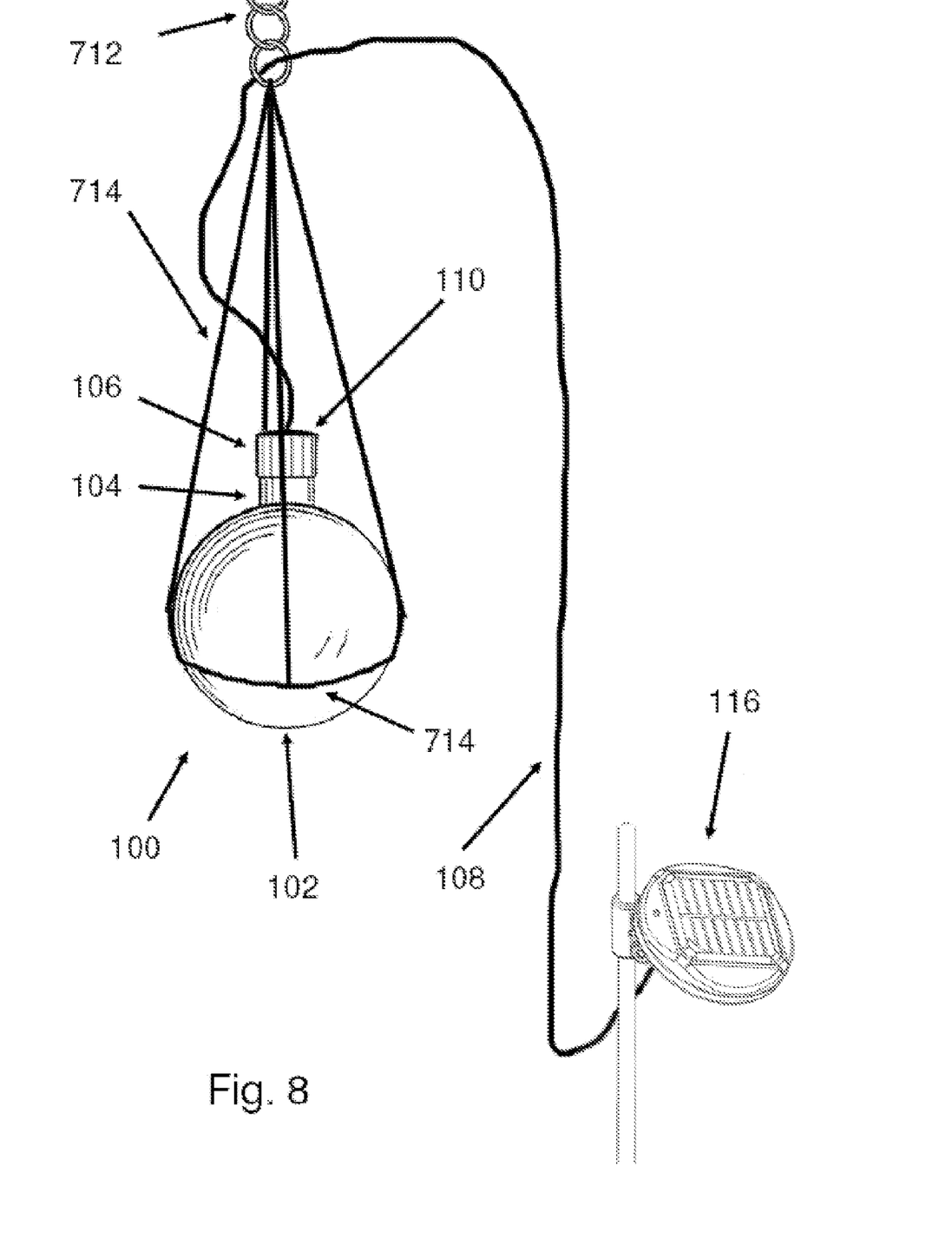
FIG. 8 is a schematic view of a solar gazing ball in accordance with an embodiment of the present invention mounted in a hanging frame.

FIG. 8 is a schematic view of a solar gazing ball in accordance with an embodiment of the present invention mounted in a frame. The gazing globe 100 has its tubular neck 104 with the base portion 110 attached via the tubular flange 106 directed upward with the globe lens supported by a flexible stranded frame 714 that is suspended below a support ring 712. The conductive wire 108 is fed up through the support ring and to the solar power collecting system 116. This enables the gazing globe to be illuminated while suspended and the flange 106 assists to prevent rainwater seeping into the globe which could damage the lighting elements within and/or fill the globe with sufficient weight of water as to cause the frame supports 714 to break and the globe to drop where it may break.

Figure 9:
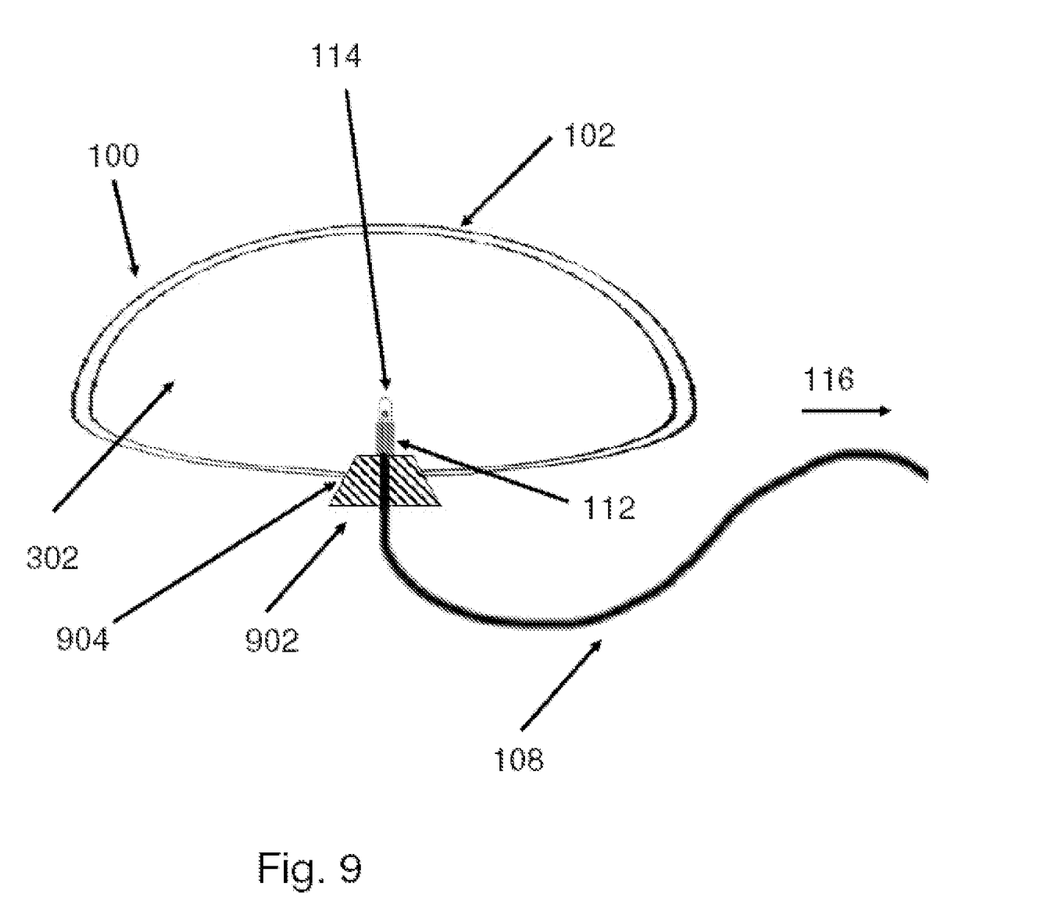
FIG. 9 is a cross-sectional view of a solar powered gazing ball in accordance with an embodiment of the present invention.

FIG. 9 is a cross-sectional view of a solar powered gazing ball in accordance with an embodiment of the present invention. The base plug portion 902 is inserted into an aperture 904 in the lower portion of the gazing globe lens body 102. The light support 112 may be attached to the base plug portion 902. The base plug portion 902 may also serve to center the light support 112 and hold the light source 114 within the interior of the gazing globe lens 302. The base plug portion 901 may have a tether means (not shown) such as a ring attached to allow a user to tether the gazing globe 100 to a specific radius from a tether location in a body of liquid. In this embodiment the gazing globe is ovoid rather than spherical. The base plug portion 902 may, for instance, be made, in part of a resilient compressible and waterproof material such as, but not limited to, a silicone rubber, a plastic or other rubber material. In this way, the base plug portion 902 forms a water proof seal with the aperture 904 of the gazing globe 100, preventing moisture entering the interior of the hollow glass lens 102 and thus allowing the gazing globe to float. This protects both any electronics contained within the gazing globe 100 and also, in the case where the gazing globe 100 incorporates fluorescent materials on the interior, the fluorescent materials. The base plug portion 902 has a conductive wire 108 that connects to a solar power collecting system 116 (not shown) that is fixed adjacent to the body of liquid.

One of ordinary skill in the art will appreciate that the solar panels 200 may serve to recharge a rechargeable power source which may be, but are not limited to, NiCd batteries.

The light source 114 may also or instead include a colored light or a light capable of being used to provide varying colors.

In one embodiment there are three LEDs of different colors being red, green and blue controlled by an integrated circuit (IC) powered by a battery electrically connected to the lighting circuit and connected independently to each of the LEDs for controlling and varying the brightness of each of the three LEDs independently of the other LEDs such that the LEDs together provide the effect of a continuously changing color spectrum. The IC independently ramps up and down the brightness of each LED in a sequence and at a speed to produce a wide spectrum of colors where each color is visible for a similar period of time. The timing of the ramping up and down of the LEDs is not constant because some colors are produced by mixing the light of two or more different colors. If the LED brightness change is constant then these mixed colors such as cyan, orange, purple, and green are only visible for a much shorter time than the primary colors during the transition between the display of the primary colors. Accordingly, the ramping speed of the LEDs are varied during the display of mixed colors to extend the visible time of those colors to have a similar visibility duration as the primary colors red, green and blue. Alternatively, there may be two light sources of different colors instead of three. Alternatively, there may be a multiple of each of either the three LEDs above or the two light sources above.

In one embodiment there is a user operable switch that activates the IC to select a desired fixed color. This user operable switch is preferably a push button switch but may be a slide switch or other type of user operable switch. The color selection is stored in memory within an IC in the circuit.

The light source 114, that may be a light emitting diode (LED) may be disposed inside, or directed into, the gazing globe 100. The gazing globe 100 may be formed, wholly or in part, of a suitable translucent or transparent material. In this example that material is glass. One of ordinary skill in the art would readily appreciate that the LED's could be replaced by any suitable light source, including a suitable luminescent material that may be a fluorescent material or a phosphorescent material.

For instance, gazing globe 100 may effectively be a lens that admits light. The lens can be made of glass, plastic, resin, or glass fibers. The lens material includes any formed material conventional to the art, such as glass, plastic or resin or glass fibers. In the present embodiment, the lens is made of glass and shaped like a sphere, having an internal layer of phosphorescent material on part of the spherical inside wall thereof. Alternatively, the glass may be impregnated directly with the phosphorescent material. The phosphorescent material may be a phosphorescent pigment. A light emitting outdoor fixture has a hollow lens that is partially impregnated or coated with a light transmissive phosphorescent element.

The luminescent material or pigment may be one or more of: Alkaline Earth Metal Aluminate (and can include Strontium, Magnesium, Calcium, and Barium, Silicon and Titanium and typically doped with Europium), Alkaline Earth Aluminate w/Fluorescent Pigment, Coated Alkaline Earth Aluminate, Alkaline Earth Silicate, and Zinc Sulfide. If Zinc Sulphide is used it needs to be waterproofed because is subject to humidity damage that causes graying of the luminescent material. The elemental zinc separates from the crystals and migrates to the surface of the material, reducing luminance.

Preferably, there is no sulfur, uranium doped, or large amounts of Zinc mixed in with any of the luminescent material or pigment. Silicate base may be added to the manufacturing process to aid with the color melting into the glass surface. Alternatively, if the luminescent material or pigment is suitable for use with the heat involved with glass working, it can be mixed in with raw clear glass powder. Large clumps of luminescent material or pigment should be avoided because this may cause the piece to crack during cooling. Very fine diameter luminescent material or pigment is preferable.

Ultraviolet light emitted by a UV LED may strike the phosphorescent material in or on the hollow glass sphere 102, and therefore the phosphorescent material is caused to emit visible light. The UV LED may be powered by a solar rechargeable battery source. A printed circuit board mounted controller may serve to automatically vary the brightness of the light source. Further, the printed circuit board mounted controller may selectively activate the light source in a time pulsed manner, The gazing globe 100 may be substantially constructed from hand-blown glass and comprise fluorescent and luminescent elements within it. The gazing globe 100 may be sealed by the tubular flange 106 to prevent moisture from reaching the fluorescent and luminescent elements.

This is achieved because a substantial percentage of the light emitted by the LED is in the ultraviolet light spectrum so that the LED emits at least some light in the blacklight ultraviolet wavelength spectrum.

At least some part of hollow glass sphere 102 exhibits fluorescence when excited by said LED and exhibits phosphorescence by emission of light by a luminescent element after excitation by the LED has ceased. The provision of the ultraviolet LED proximate to the phosphor assures that upon activation of the LED, the phosphor is excited and continues to phosphoresce after the LED has been deactivated.

Regardless of the application method, once the phosphorescent material is proximate to the surface of the hollow glass sphere 102, the UV LED directed into or located within the lens affords a highly efficient excitation of the phosphor resulting in efficient phosphorescent emission. A UV LED operative in the present invention preferably emits either UV-A corresponding to between 315 nm and 405 nm or UV-B corresponding to between 280 nm and 320 nm. Operative UV LEDs herein include gallium indium nitride and gallium nitride.

Preferably, power is provided to the LED by a rechargeable battery that is charged by a solar photovoltaic panel made from silicon. The battery source is selected according to the present invention to have a voltage output to activate the light source. Battery types operative herein alone or in series to increase the output voltage include nickel cadmium, nickel metal hydride, rechargeable alkaline and lithium batteries.

A user operable switch may selectively illuminate the LED. A battery (not shown) within the housing selectively forms a circuit with contacts of the switch and leads of the LED upon switch engagement. The emission from the LED is directed onto phosphorescent laded glass lens from within. The now stimulated phosphorescent pigments emits visible light for a period of time consistent with the phosphorescent particulate decay time during the evening hours after the LED ceases to illuminate.

As a rule of thumb, if emission stops after the excitation source has been removed, then the resulting luminance is called fluorescence; if emission continues (so called "afterglow") then it is called phosphorescence.

The excitation time and saturation are primarily dependent on ultraviolet irradiance of the material. Phosphorescent paints, enamels and colorants are well known to the art and include, for example, U.S. Pat. Nos. 1,407,534; 1,637,963; and 5,472,737. The choice of phosphor being dictated by the desired color of phosphorescence. Exemplary phosphor materials known to the art illustratively include group II metal-calcogenides, rare earth oxides, sulfides, phosphates, and combinations thereof doped with lanthanide series ions, such as $CaSr_2S:Bi$, $CaAl_2O_4:Eu, Nd$; and $CaSrS:Eu, Dy$. Specific compositions and colors are well known to the art as detailed, for example, in U.S. Pat. Nos. 2,372,071; 2,979,467; 5,043,096; 4,857,228; 5,424,006; and 5,376,303. It is appreciated that multiple color phosphors are readily applied to a lens to yield regions of differing color emission.

The best light sources for excitation are those rich in ultraviolet light.

The light source 114 includes at least one of, at least LED, and a phosphorescent emitter element. Preferably, the light source is a light emitting diode (LED). The light source may also has a variable color output provided by at least two light emitting diodes where the first light emitting diode has a first single color output and a second light emitting diode where the first color output differs from the second color output. Preferably, in one of the instances of a single LED, or multiple LEDs, the light source includes a UV output or UV LED. The variable color light source optionally includes a third light emitting diode having a third color output, where the third color output varies from the second color output. The variable color output of the light source is varied automatically through the printed circuit board controller, which automatically cycles the light source color upon initial switch activation and continues to cycle the colors until switch deactivation. Typical cycle times range from 5 to 300 seconds.

Alternatively, the controller may vary the brightness of the light source up and down in brightness. Optionally, the cycle includes a period of no emission to allow for isolate visible phosphorescence emission. When multiple light sources are present, it is appreciated that two or more light sources having different emission characteristics can be controlled to afford different illumination levels and therefore a varying color emission. Preferably, the light source is oriented to direct a majority of the emission there from into and through the lens.

In an alternative embodiment, the light source is a UV LED, as described above and the lens is decorated with a phosphorescent pigment that is stimulated by the emission of UV LED. Preferably, when the light source is UV LED, the UV LED is activated in a time pulsed manner by the controller consistent with the decay time of the phosphor pigment.

The switch is provided for selectively forming an electrical engagement between the light source and the battery source. Preferably, the switch is automatically activated by light levels through the use of a cadmium sulfide light activated resistor. Preferably the switch is a first switch and a there is second a manual user operable switch. The second switch is preferably accessible externally to the lens.

Figure 10:
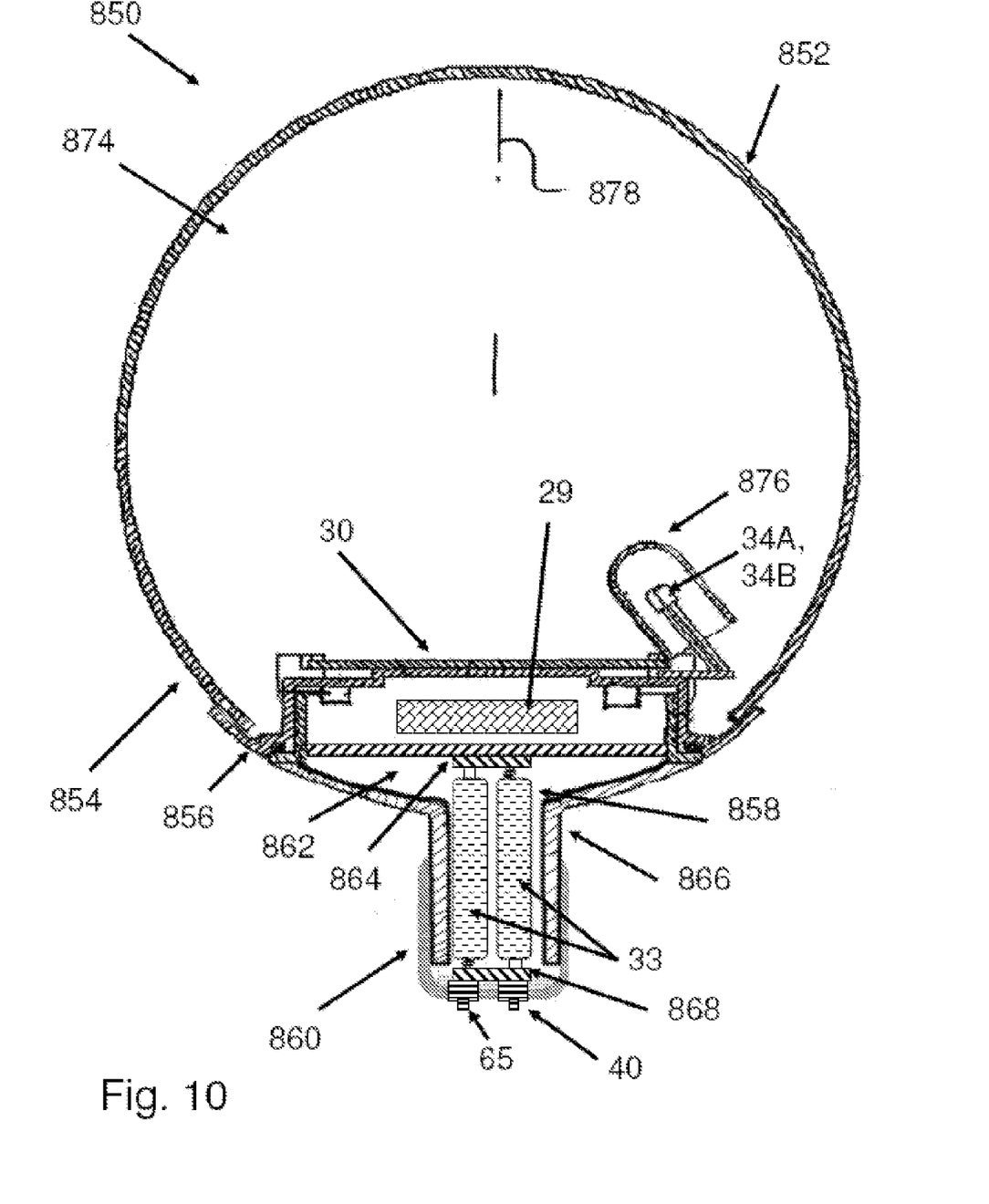
FIG. 10 is schematic depiction of a lighting device 850 that is a modification of the previously described lighting devices.

FIG. 10 is schematic depiction of a lighting device 850 that is a modification of the previously described lighting devices.

The lighting device 850 employs the circuit of FIG. 6.

In this embodiment, the lighting device 850 includes a lens 852 of generally spherical form consisting of a lower portion 856 fixed to an upper portion 854. Preferably, the lower portion 856 and upper portion 854 are fixed in a waterproof manner by a permanent waterproof adhesive. A neck 866 extends from the lower portion 856. Preferably, the lower portion 856 is made from a thermoplastic. Preferably, the upper portion 854 is made of glass.

The lower portion 856 includes a battery compartment 858 providing a cavity 862 within which a battery holder 868 is located and supports vertically oriented batteries 33. The battery compartment 858 is closed by a closure member 860 that acts as a cap or lid closing the cavity 862. The member 860 includes a pad 864 that abuts the batteries 33 to aid in retaining them in position. The closure member 860 has electrical contacts to provide electrical connections between the batteries when the closure member is closed.

The lens 852 encloses a chamber 874 to which the solar cell 30 is exposed so that the solar cell 30 receives light through the lens 852. Located proximate to the solar cell 30 is a circuit board having the circuit 29.

Mounted in the chamber 874 are the LEDs 34A, 34B that are covered by means of a translucent diffuser 876.

Mounted on the closure member 860 is the switch 40 and/or switch 65 of the circuit 29.

The battery compartment 858 includes a generally circular internally threaded closure member 860 that threadably engages the circular neck 866 of the lower portion 856.

In respect of the above preferred embodiment, the battery compartment 858 is integrally formed with the neck 866 and engages the closure member 860 by means of an annular seal (not shown) to sealingly connect the closure member 860 to the neck 866.

To provide access to the batteries 33 and switches 40 and 65, the lens 852 is rotated about the axis 878 relative to the closure member 860 so there is relative movement between the closure member 860 and the neck 866. This relative movement removes the closure member 860 from the lens 852. Accordingly a user may then remove the batteries 33 for replacement. Alternatively, the circuit 29 is switched on by relative movement between the closure member 860 and the neck 866, which separates the batteries from electrical contacts.

Alternatively, the closure member 860 not threaded but is resilient and secures to the smooth sided neck 866 via an elastic fit.

In a further embodiment, in which the lighting system includes a light emitting diode that has an emission spectrum that includes light capable of exciting a luminescent material associated with the gazing globe, the lighting subsystem may include circuitry for cycling the light emitting diode between an "on" state that causes the luminescent material to emit fluorescent light and an "off" state that allows the luminescent material to emit phosphorescent light. Cycling from the on to the off state may take place in a time scale of several seconds, or it may take place over a time scale of minutes, or any suitable time scale in-between.

Moreover, the lighting system may also include a switch to allow a user to select between the light emitting diode being in the "on" state, being in the "off" state or being in the state of cycling between the "on" and the "off" state.

Although, in the embodiments illustrated above, the gazing globe has been shown resting on a support, one of ordinary skill in the art will appreciate that the globes may also be suspended from a support, as illustrated in, for instance, U.S. patent application Ser. No. 11/303,247 filed on Dec. 16, 2005 by Simon N. Richmond entitled "An Illuminated Wind Chime", to which this application is a continuation-in-part, and the contents of which are already incorporated by reference in this application.

For instance, a housing element may house the solar energy system. The housing element may be part of a support system, such as, but not limited to, a removable stake. Or the housing system may itself be suspended from a support system. The housing may include a suspension element from which the gazing globe may be suspended.

In a further embodiment, the solar energy system may include a solar panel that is suspended beneath the gazing globe.

In a further embodiment, the solar energy system, including the solar panel, may be contained inside the gazing globe.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A decorative solar lighting apparatus for a gazing globe comprising:
   a rechargeable electrical power source coupled to an electrical charging system for charging said power source;
   a solar energy system conductively coupled to said charging system for collecting solar energy, converting said solar energy into electrical energy, and transferring said electrical energy to said charging system;
   at least one lighting subsystem comprising at least one light source electrically coupled to said rechargeable electrical power source and wherein said at least one light source is capable of being situated such that light is emitted from said gazing globe via at least one light transmitting region, wherein said lighting subsystem comprises at least one light emitting diode having an emission spectrum that includes light capable of exciting a luminescent material associated with said gazing globe and circuitry for automatically cycling said at least one light emitting diode between an on state that causes said luminescent material to emit fluorescent light and an off state that allows said luminescent material to emit phosphorescent light, said cycling occurring over a time period in a range from 1 second to 300 seconds; and
   a base portion having a substantially tubular, stretchable flange, and wherein said base portion is capable of being removably, elastically suspended from said gazing globe via said substantially tubular, stretchable flange thereby providing a substantially water-tight seal, and wherein said base portion further comprises at least one electrical conductor, thereby providing said coupling between said at least one light source and said rechargeable electrical power source.

2. The apparatus of claim 1 further comprising said gazing globe having a substantially hollow body and a tubular neck extending from said hollow body; and wherein said body includes at least one light transmitting region.

3. The apparatus of claim 1 wherein said solar energy system comprises a solar panel, and further comprising a solar panel suspension element for flexibly suspending said solar panel from said gazing globe.

4. The apparatus of claim 1 further comprising said gazing globe and further comprising a housing for said solar energy system, said housing being rigidly attached to said gazing globe and further comprising a suspension element attached to said housing and capable of suspending said housing and attached gazing globe from a support.

5. The apparatus of claim 1 further comprising a switch to allow a user to select either a state of automatically cycling said at least one light emitting diode between said on state and said off state, or a state in which said at least one light emitting diode is off.

6. The apparatus of claim 1 further comprising a switch to allow a user to select between said at least one light emitting diode being in said on state, being in said off state or being in a state of automatically cycling between said on and off state.

7. A decorative apparatus comprising:
   a decorative gazing globe having a partially hollow body and a tubular neck extending from said body;
   a base portion having a substantially tubular, stretchable flange, and wherein said base portion is removably elastically fitted to said tubular neck by said substantially tubular, stretchable flange thereby forming a substantially water-tight seal;
   a first light source wherein said first light source comprises a luminescent material proximate to said partially hollow body, capable of emission in a first range of wavelengths;
   a second light source having a suitable, second range of wavelengths and being situated such that said second light source comprises at least one light emitting diode having an emission spectrum capable of causing said first light source to emit light; and
   wherein at least one of said first light source or said second light source is situated such that a portion of said globe emits light; and
   wherein said light emitted by said globe automatically varies in brightness over a time period in a range from 1 second to 300 seconds.

8. The decorative apparatus of claim 7 wherein said luminescent material comprises a phosphorescent material.

9. The decorative apparatus of claim 7 wherein said luminescent material comprises a fluorescent material.

10. The decorative apparatus of claim 7 wherein said decorative apparatus further comprises circuitry for automatically cycling said second light source between an on state that causes said luminescent material to emit fluorescent light and an off state that allows said luminescent material to emit phosphorescent light.

11. The apparatus of claim 10 further comprising a user-operated switch to allow a user to select between a non-cycling state and said state of cycling between said on and off state.

12. A decorative solar lighting apparatus for a gazing globe comprising:
    a rechargeable electrical power source coupled to an electrical charging system for charging said power source;
    a solar energy system conductively coupled to said charging system for collecting solar energy, converting said solar energy into electrical energy, and transferring said electrical energy to said charging system; and
    at least one lighting subsystem comprising:
    at least one light source electrically coupled to said rechargeable electrical power source and wherein said at least one light source is capable of being situated such that light is emitted from said gazing globe via at least one light transmitting region, and wherein said at least one light source comprises at least one light emitting diode having an emission spectrum that includes light capable of exciting a luminescent material associated with said gazing globe; and
    circuitry for automatically cycling said at least one light emitting diode between an on state that causes said luminescent material to emit fluorescent light and an off state that allows said luminescent material to emit phosphorescent light, said cycling occurring over a time period in a range from 1 second to 300 seconds; and
    a partially compressible, resilient base portion capable of forming a substantially water-tight seal with said gazing globe, and wherein said base portion includes a light support and a light source, and is capable of being removably, partially inserted into an aperture in said gazing globe and wherein said base portion further comprises at least one electrical conductor, thereby providing said coupling between said at least one light source and said rechargeable electrical power source.

13. The apparatus of claim 12 further comprising said gazing globe having a substantially hollow body; and wherein said body includes at least one light transmitting region.

14. The apparatus of claim 12 further comprising a switch to allow a user to select either a state of automatically cycling said at least one light emitting diode between said on state and said off state, or a state in which said at least one light emitting diode is off.

15. The apparatus of claim 12 further comprising a switch to allow a user to select between said at least one light emitting diode being in said on state, being in said off state or being in a state of automatically cycling between said on and off state.

16. A decorative solar lighting apparatus for a gazing globe comprising:
    a rechargeable electrical power source coupled to an electrical charging system for charging said power source;
    a solar energy system conductively coupled to said charging system for collecting solar energy, converting said solar energy into electrical energy, and transferring said electrical energy to said charging system; and
    at least one lighting subsystem comprising at least one light source electrically coupled to said rechargeable electrical power source and wherein said at least one light source is capable of being situated such that light is emitted from said gazing globe via at least one light transmitting region, and wherein said at least one light source comprises at least one light emitting diode having an emission spectrum that includes light capable of exciting a luminescent material associated with said gazing globe;
    a partially compressible, resilient base portion capable of forming a substantially water-tight seal with said gazing globe, and wherein said base portion includes a light support and a light source, and is capable of being removably, partially inserted into an aperture in said gazing globe and wherein said base portion further comprises at least one electrical conductor, thereby providing said coupling between said at least one light source and said rechargeable electrical power source; and
    wherein said solar energy system is situated at least laterally and moveably remote from said base portion and is connected to said base portion via flexible electrical conductors of at least 0.1 meters.

17. A decorative solar lighting gazing globe, comprising:
    a substantially hollow body having an aperture, said body comprising at least one light transmitting region;
    a first light source comprising a luminescent material proximate to said hollow body, said luminescent material being capable of emission in a first range of wavelengths;
    an electrical charging system coupled to charge a rechargeable electrical power source;
    a solar energy system comprising a solar energy collection unit for collecting solar energy, a conversion unit for converting said solar energy to electricity, and a transfer circuit for transferring said electricity to said electrical charging system;
    a second light source, electrically coupled to said electrical charging system and having an on state in which said second light source emits light in a second range of wavelengths, and being located such that said emission in said second range of wavelengths causes said luminescent material to emit fluorescent light from a portion of said hollow body, and having an off state in which said luminescent material may emit luminescent light;
    circuitry for automatically cycling said second light source between said on state and said off state, said cycling occurring over a time period in a range from 1 second to 300 seconds; and
    a switch to allow a user to select between being in an off state or being in said state of automatically cycling between said on state and said off state.

18. A decorative solar lighting device, comprising:
    a body having an aperture, said body comprising at least one light transmitting region;
    a first light source comprising a luminescent material proximate to said body, said luminescent material being capable of emission in a first range of wavelengths;
    an electrical charging system coupled to charge a rechargeable electrical power source;
    a solar energy system comprising a solar energy collection unit for collecting solar energy, a conversion unit for converting said solar energy to electricity, and a transfer circuit for transferring said electricity to said electrical charging system;

a second light source, electrically coupled to said electrical charging system and having an on state in which said second light source emits light in a second range of wavelengths, and being located such that said emission in said second range of wavelengths causes said luminescent material to emit fluorescent light from a portion of said body, and having an off state in which said luminescent material may emit luminescent light; and circuitry for automatically cycling said second light source between said on state and said off state, said cycling occurring over a time period in a range from 1 second to 300 seconds.

19. A decorative solar lighting apparatus for a gazing globe comprising:

a rechargeable electrical power source coupled to an electrical charging system for charging said power source;

a solar energy system conductively coupled to said charging system for collecting solar energy, converting said solar energy into electrical energy, and transferring said electrical energy to said charging system;

at least one lighting subsystem comprising at least one light source electrically coupled to said rechargeable electrical power source and wherein said at least one light source is capable of being situated such that light is emitted from said gazing globe via at least one light transmitting region, wherein said lighting subsystem comprises a light emitting diode having an emission spectrum that includes light capable of exciting a luminescent material associated with said gazing globe; and a base portion having a substantially tubular, stretchable flange, and wherein said base portion is capable of being removably, elastically suspended from said gazing globe via said substantially tubular, stretchable flange thereby providing a substantially water-tight seal, and wherein said base portion further comprises at least one electrical conductor, thereby providing said coupling between said at least one light source and said rechargeable electrical power source; and wherein said solar energy system is situated at least laterally and moveably remote from said base portion and is connected to said base portion via flexible electrical conductors of at least 0.1 meters.

* * * * *